United States Patent [19]

Wagner

[11] Patent Number: 4,664,860

[45] Date of Patent: May 12, 1987

[54] PROCESS FOR IMPROVING THE EMBOSSING PROPERTIES OF FOAMED SHEETS, AND USE OF A LACQUER SOLUTION IN SUCH PROCESS

[75] Inventor: Alfred Wagner, Lindhorst, Fed. Rep. of Germany

[73] Assignee: J. H. Benecke GmbH, Hanover, Fed. Rep. of Germany

[21] Appl. No.: 863,000

[22] Filed: May 14, 1986

[30] Foreign Application Priority Data

May 14, 1985 [DE] Fed. Rep. of Germany ....... 3517436

[51] Int. Cl.$^4$ .......................... B29C 59/00; B32B 27/06
[52] U.S. Cl. .................................... 264/134; 264/293; 427/271; 427/359
[58] Field of Search ...................... 264/46.5, 134, 284, 264/293, DIG. 3, DIG. 82; 427/271, 277, 278, 359

[56] References Cited

U.S. PATENT DOCUMENTS

| | | | |
|---|---|---|---|
| 3,196,062 | 7/1965 | Knital | 264/284 |
| 3,224,894 | 12/1965 | Palmer | 427/277 |
| 4,353,949 | 10/1982 | Kyminar et al. | 427/278 |

FOREIGN PATENT DOCUMENTS 25385  7/1976  Japan ................... 427/278

Primary Examiner—James Lowe
Attorney, Agent, or Firm—Cushman, Darby & Cushman

[57] ABSTRACT

A process for improving the embossing properties of foamed sheets on a PVC basis including the steps of (1) treating the foamed sheets with a lacquer solution of 10 to 20% by weight of a resin in 4 to 10% by weight of a lacquer solvent having a boiling point greater than 190° C., and in 70 to 86% by weight of a lower boiling point organic solvent; (2) drying the lacquer treated sheet at temperatures ranging from 70° to 100° C.; and (3) embossing said dryed sheet at temperatures greater than 200° C.

3 Claims, No Drawings

PROCESS FOR IMPROVING THE EMBOSSING PROPERTIES OF FOAMED SHEETS, AND USE OF A LACQUER SOLUTION IN SUCH PROCESS

BACKGROUND OF THE INVENTION

The present invention relates to a process for treating foamed sheets on a polyvinyl chloride (PVC) basis to improve the embossing properties of the foamed sheets.

In the production of foamed sheets on a PVC basis the top side of the foamed sheet is treated in a separate operation with a lacquer solution in order to give an after-treatment to the surface of the foamed sheet. This after-treatment, which is also known as surface finish, is intended to give the sheet surface particular properties, such as dryness or dirt repellancy, and also to create a barrier effect against the emigration or exudation of plasticizers and to give the sheet a generally pleasant appearance.

Hitherto, lacquer solutions of a resin in a low-boiling lacquer solvent have been used, such as, for example, polymethyl methacrylates in combination with PVC, which may if necessary contain matting agents such as silicon dioxide or finely divided polyethylene waxes to matt the lacquer and also tin stabilizers. Generally the lacquer solutions consisted of 10 to 20% by weight of a resin, the remainder being low-boiling lacquer solvent such as, for example, methyl-ethyl ketone.

The foamed sheets with a surface coating of such a lacquer solution were then dried to remove the solvent at temperatures between 80° and 100° C., a lacquer film being formed by the evaporation of the solvent. After the film had formed, the foamed sheet thus treated was embossed at temperatures of over 200° C.

A considerable disadvantage of these conventional processes is that due to the drying speeds of over 20 m/minute required to remove the low-boiling lacquer solvent the latter cannot be completely removed, and a quantity of the solvent (for example, 3 g/m$^2$) is left in the foamed sheet; this cause bubbles during the subsequent embossing operation, the result being an unsightly surface.

It is an object of the present invention to improve a process for enhancing the embossing properties of such foamed sheets on a PVC basis and to propose the use of a lacquer solution by which a better surface is obtained.

SUMMARY OF THE INVENTION

In accordance with a presently preferred, exemplary embodiment, a process is provided for improving the embossing properties of foamed sheets on a PVC basis including the steps of: (1) treating the foamed sheet with a lacquer solution of 10 to 20% by weight of a resin in 4 to 10% by weight of a lacquer solvent having a boiling point greater than 190° C., and in 70 to 86% by weight of a lower boiling point organic solvent; (2) drying the lacquer treated sheet at temperatures ranging from 70° to 100° C.; and (3) embossing the dryed sheet at temperatures greater than 200° C.

DETAILED DESCRIPTION OF THE INVENTION

The present invention provides in its broadest sense, a process for improving the embossing properties of foamed sheets.

It has surprisingly been found that when a lacquer solution is used which consists entirely of a low-boiling substance such as, for example, methyl-ethyl ketone and resin, bubbles are formed during the embossing operation, since under the heavy embossing conditions of over 200° C. the residual solution evaporates explosively. It has also surprisingly been found that such bubble formation cannot be remedied by the obvious use of an even lower boiling solvent, which can be more readily removed even during drying, but that on the contrary very much better results are obtained by the addition of a high-boiling solvent. Although the reason for this has not yet been fully explained, it is assumed that during lacquering operation and drying, more high-boiling solvent than low-boiling solvent is left in the foamed sheet, and due to its high boiling point, the residual mixture of solvents is no longer so sensitive to heat, and does not therefore evaporate explosively during the embossing operation and contribute towards bubble formation on the surface.

The present exemplary embodiment includes treating foamed sheets with a lacquer solution of 10 to 20% by weight of a resin in 4 to 10% by weight of a lacquer solvent having a boiling point greater than 190° C., and in 70 to 86% by weight of a lower boiling point organic solvent; drying the treated sheets at temperatures ranging from 70° to 100° C.; and embossing the dryed sheets at temperatures greater than 200° C.

Preferably, use is made of the high-boiling lacquer solvent, N-methyl pyrrolidone, in a quantity of 4 to 10% by weight, more particularly 5% by weight, together with 70 to 86% by weight of a low-boiling solvent, preferably methyl-ethyl ketone, and more particularly in a quantity of 81% by weight, with a resin component of 10 to 20% by weight, more particularly 14% by weight.

The high-boiling lacquer solvent preferably used in N-methyl pyrrolidone, which has a boiling point of 203° C. and an evaporation number of 360, the evaporation number being defined as the evaporation speed, referring to a value of 1 for diethyl ether. As regards toxicity and its other properties, N-methyl pyrrolidone is particularly advantageous and in many respects easier to handle than other low-boiling solvents.

The lower boiling component, preferably, methyl-ethyl ketone, can also be partly or completely replaced by other low-boiling substances such as acetone (bp: 56° C.), tetrahydrofuran (bp: 66° C.) or cyclohexanone (bp: 157° C.).

The resin component mainly consists of polymethyl methacrylates in combination with PVC, and preferably in a weight ration of 1:1; small quantities of matting agents and stabilizers can also be present.

The foamed sheets treated according to the invention can be deep-drawn without the formation of undesirably small bubbles.

EXAMPLE

To illustrate the invention, the following example is presented:

(A) Production of the foamed sheet

To produce a foamed sheet by the indirect coating process on a smooth separating paper, first a covering paste in a quantity of 500 g/m$^2$ and a thickness of about 0.4 mm was scraped onto a separating paper and pre-gelled, whereafter a PVC foamed paste was applied in a quantity of 1 100 g/m$^2$ and a thickness of about 0.9 mm. Then the sheet was gelled and foamed in a hot air channel. After cooling, the foamed sheet was drawn off the separating paper and had a total thickness of 2.7 mm. The covering paste and the foamed paste were processed with a dialkyl pthalate plasticizer in a PVC; plasticizer ratio of 55:45 to 65:35, insoluble pigments being used in the plasticizer for dyeing purposes. The foamed paste also received the usual chemical expanding agents such as azodicarbonamide. To harmonize the decomposition range of the expanding agent, which is about 220° to 240° C., to the gelling range, which is at temperatures between 160° and 200° C., use was made of conventional stabilizers on the basis of Zn or K-Sn compounds.

(B) Lacquering

The resulting foamed sheet was treated with a high-boiling lacquer having the following composition:

| Resin component (polymethyl methacrylate/PVC (1:1)) | 14% by weight |
| --- | --- |
| Methyl-ethyl ketone as low-boiling agent | 80% by weight |
| N—methyl pyrrolidone as high-boiling agent | 5% by weight |
| Additives such as matting agents | 1% by weight |

This lacquer solution was applied by intaglio cylinders to the foamed sheet in a quantity of 18 g/m² (wet) or 2.5 g/m² (dry) in a thickness of about 2 to 3 m.

The lacquer was then dried at temperatures between 80° and 100° C. (as usual at a speed of over 20 m/minute), about 3 g/m² of solvent remaining in the foamed sheet after drying.

During subsequent embossing at temperatures of over 200° C., embossed foamed sheets with excellent surface texture were obtained, which could be deep-drawn without the formation of visible small bubbles.

What is claimed is:

1. A process for improving the embossing properties of foamed sheets on a PVC basis comprising:
   treating said foamed sheet with a lacquer solution of 10 to 20% by weight of a resin in 4 to 10% by weight of a lacquer solvent having a boiling point greater than 190° C., and in 70 to 86% by weight of a lower boiling point organic solvent;
   drying said lacquer treated sheet at temperatures ranging from 70° to 100° C.; and
   embossing said dryed sheet at temperatures greater than 200° C.

2. A process according to claim 1, wherein said foamed sheets are treated with a lacquer solution containing N-methyl pyrrolidone as the higher-boiling component.

3. A process according to claim 1, wherein said foamed sheets are treated with a lacquer solution of methyl-ethyl ketone as the low-boiling lacquer solvent and N-methyl pyrrolidone as the high-boiling lacquer solvent.

* * * * *